Jan. 7, 1936. P. K. DEVERS 2,027,155
APPARATUS FOR AND METHOD OF FUSING VITREOUS MATERIAL
Filed Oct. 30, 1934
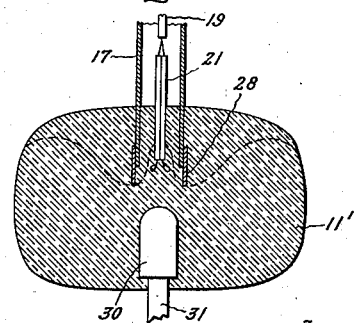
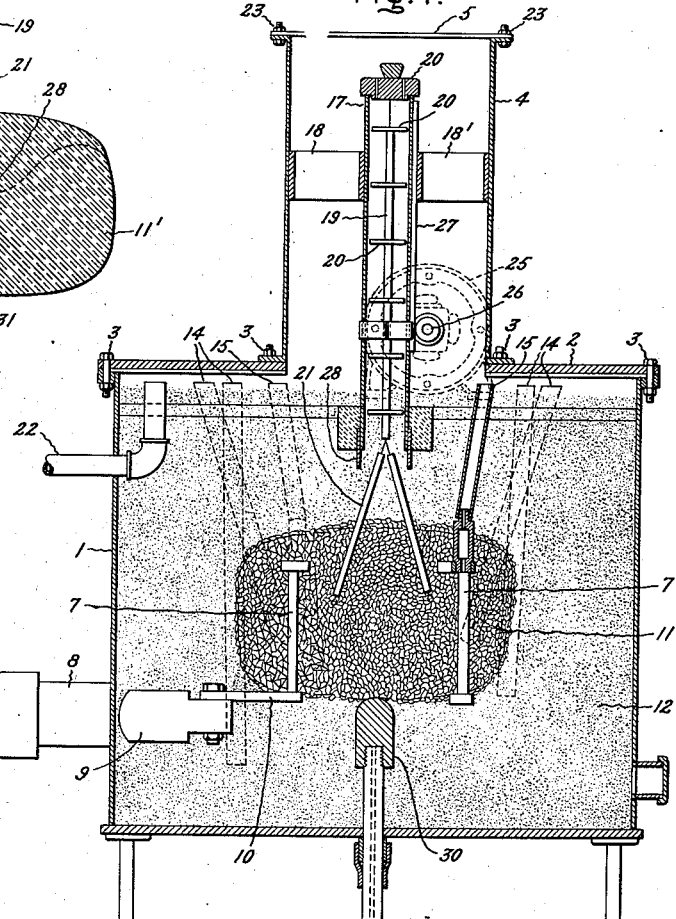
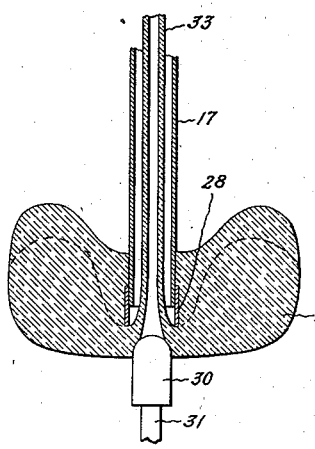
Inventor:
Philip K. Devers,
by Harry E. Dunham
His Attorney.

Patented Jan. 7, 1936

2,027,155

UNITED STATES PATENT OFFICE 2,027,155

APPARATUS FOR AND METHOD OF FUSING VITREOUS MATERIAL

Philip K. Devers, Lynn, Mass., assignor to General Electric Company, a corporation of New York Application October 30, 1934, Serial No. 750,624

6 Claims. (Cl. 49—78.1)

The present application relates to the fabrication of shaped ware, such as tubing or cane, from silica or other difficultly fusible material, and it constitutes an improvement in both the apparatus and the method shown and described in my prior U. S. Patent 1,862,358 issued June 7, 1932. It is the object of my present invention to reduce substantially the large loss of material formerly attendant to the production of silica ware; further to improve the quality and uniformity of such ware, and also to regulate the dimensions of ware being made by the method therein described.

Silica, unlike ordinary glass, cannot be converted to a mobile liquid by fusion, but it can be converted to a highly viscous semi-solid at a sufficiently high temperature. Its fabrication into cane, tubes, or other shaped ware, can be carried out by drawing, or otherwise working, the semi-solid silica, but only under considerable difficulty. My prior patent describes the production of elongated silica ware, by the drawing of silica from a mass of silica which is held at its plasticity temperature in a furnace. Unfused material is excluded by drawing the silica through an orifice in a chute or die from the mass of plastic silica. In the production of silica tubing a core usually cooperates with the die to assist in shaping and sizing the tubing, the die and core projecting into the plastic silica from opposite directions into close proximity with one another.

Heretofore, a very large wastage of silica charge has been entailed in this drawing process. The high viscosity of fused silica rendered it impossible to withdraw more than a small portion of the high grade silica fusion from the furnace before the surrounding packing material was drawn in and became mingled with the high grade silica at the orifice. For example, from a fusion of 1200 pounds of silica no more than about 150 pounds of tubing or cane could be produced, the remainder of the fusion constituting a loss.

In accordance with my invention this large wastage of product is reduced to a small fraction by providing means whereby the position of die and core may be shifted progressively in the plastic mass as the drawing of silica proceeds so as to keep the region of egress of the silica at a predetermined relation to the center of mass of the fusion.

It is also a feature of my invention to carry out the initial fusion while holding the die and the core (which commonly consists of graphite), out of contact with the silica until the fusion is substantially complete and then introducing the die and the core (if the latter is required) thereby substantially preventing the contamination of the charge which formerly occurred by the percolation throughout the mass of unfused particles of carbonaceous or other chemically active gas derived by chemical action due to contact of such members with the fused silica.

The movability of the die relative to the fusion mass and the movability of the die and core, relative to one another, further makes it possible to control the dimensions of the stock being drawn.

An apparatus suitable for carrying out my invention is illustrated in the accompanying drawing in which Fig. 1 illustrates a vertical section of a resistance furnace with a charge in position ready for fusion. Fig. 2 is a section through the fusion with the core and die penetrating the fusion ready for drawing, and Fig. 3 illustrates the fusion in a later stage, a tubing being shown emerging from the fusion.

As in the apparatus of my above mentioned patent the furnace illustrated comprises a sheet metal container 1 constituting a fusion chamber which is provided with a removable cover 2, secured to the container by the bolts 3. Projecting upwardly from the fusion chamber is a tower 4 which also is provided with a removable cover 5. Within the fusion chamber is arranged a resistance heater 7 consisting of vertical graphite rods which are connected in series by horizontal bars of graphite (not shown). This heater is supplied with electric current by two terminals, 8, 9, the latter being shown as passing through the wall of the container and being connected to the heater by suitable links, one of which is shown at 10. Packed around the resistance heater is a charge 11 consisting either of irregular fragments of quartz crystals, or of a coarse form of silica sand. The charge 11 which is intended to be fused in turn is surrounded by a heat-insulating and supporting mass 12 of fine sand, which need not be of as high purity as the charge 11.

A number of vent pipes 14 consisting of graphite or other suitable material project from the external layers of the charge 11 to the space above the sand packing 12 and serve for the removal of gases from the charge during fusion. Gases are also removed through a vent pipe 15 from the resistance heating elements. These features are described in my prior patent 1,862,358. They are indicated here merely to completely disclose the nature of the apparatus to which the present invention is applicable. In the tower 4 is located a tubular conduit 17 which is connected to the interior walls of the shaft 4 by members 18 and 18'. Within the conduit 17 is located a rod 19 which is supported from the plug 20 which closes the top of the conduit 17. The rod 19 is provided with a number of heat baffles 20 and is attached at its lower end to a bait 21 whereby the silica is withdrawn from the furnace. This bait as shown in the drawing consists of wires surrounded by silica tubes to which the silica fusion adheres when the furnace with its charge is heated to the operating temperature. During the fusion period the furnace is evacuated through a conduit 22, leading to a suitable vacuum pump which is not shown.

When the fusion is complete the cover 5 is removed by disengaging the bolts 23. Traction is applied to the member 19 thereby causing the bait 21 to be withdrawn from the plastic silica fusion which is indicated at 11' in Figs. 2 and 3, the bait 21 assuming a nearly parallel position (Fig. 2). Conduit 17 then is caused to be moved downwardly by the action of the motor 25 which is located exterior to the tower 4 and has a shaft 26 projecting through the wall of the tower. The shaft 26 is geared or otherwise operatively connected to a ratchet 27 applied to the exterior of the conduit 17 so that by the rotation of the motor 25 the conduit 17 can be lowered to penetrate into the fusion 11' to assume the position shown in Fig. 2. At the end of the conduit 17 is provided a refractory nozzle 28 which may consist of graphite. This nozzle as indicated in Figs. 2 and 3 forms a die through which the silica is drawn. Unfused packing material on top of the fusion 11' may be brushed away. If the packing is fused it emerges ahead of the pure silica. This initial "pull" may be discarded.

At the lower end of the furnace is mounted a core 30 attached to the end of a rod 31 which may also be moved up and down into suitable gearing by motor 32. If silica tubing is to be produced, then the core 30 is moved upwardly into the plastic charge into close proximity to the die 28 as shown in Fig. 2.

At the beginning of the drawing operation the core and die should be located somewhat above the center of the plastic mass. The plastic mass may assume a roughly lenticular shape with blunt ends as shown in Fig. 2. As the withdrawal of silica continues the upper meniscus of the plastic charge 11' sinks to assume the form shown by dotted lines. If the drawing were continued beyond this point, then the silica tubing or cane withdrawn from the furnace would become contaminated with unfused material surrounding the fusion 11. If, however, as shown in Fig. 3 the die 28 attached to the chute 17 is lowered by the action of the electric motor 25 the core 30 likewise being lowered, then the drawing of the fused silica may be continued as indicated in the figure. As here shown, the silica tube 33 is still being withdrawn from the plastic charge, although the center of the charge has become very much depresed, as shown by full lines. As the upper surface of the charge assumes a form generally indicated by dotted lines, then the die 28 and core 30 may be progressively advanced through the fusion until finally practically all of the center mass of the charge has been withdrawn from the furnace leaving in the furnace only relatively small quantities of fused silica remote from the inlet of the core as will be evident from the indication of Fig. 3.

As a consequence of my invention the efficiency of the furnace is very much increased by making the core and die movable with respect to the charge and providing power means external to the furnace for bringing about the required motion. It is also possible by regulating the spacing between the mouth of the die 28 and the core 30 to vary the diameter and wall thickness of the stock being drawn from the furnace. For example, in the production of tubular stock of different external diameter the following procedure is carried out:

(1) To increase the outside diameter and maintain the same wall thickness, the core and die are pushed together more closely and the rate of pull is decreased.

(2) To decrease the outside diameter and maintain the same wall thickness, the core and die are separated further and the rate of pull is increased. To reduce the wall thickness and increase the outside diameter, the die and core are pushed together more closely than would be the case if the same wall thickness were desired. Also, changing the orientation of the die and core with relation to the fused mass will vary the tube dimensions, even when the spacing of the die and core remain unchanged. For example, if the die and core are moved to a lower zone in the fusion the resistance to pull will be increased, and the wall thickness will be reduced. Conversely, if the die and core are raised to a higher zone in the fusion the resistance to the pull will be decreased, and the wall thickness will be increased.

What I claim as new and desire to secure by Letters Patent of the United States, is:

1. An apparatus for producing shaped ware from fusible material which consists in a furnace housing for holding a charge of said material, means for heating said charge to fusion temperature, a chute-like die arranged above said charge and being movably mounted to permit of advancing and withdrawing motion to penetrate said charge, external means for reciprocating said die, a core mounted below said die, means for reciprocating said core to maintain said core in predetermined relation to said die irrespective of motion of the latter, and means for withdrawing plastic material through a space between said die and said core through said die.

2. An apparatus for producing shaped ware from a fusible refractory material which consists of means for fusing a mass of said material in an evacuated space, means for drawing fused material from a confined region in said mass, means for confining the material being drawn, and means for advancing the region of egress of said material from said fusion during the period of drawing.

3. The method of drawing elongated stock from a silica fusion through a die submerged in said fusion which consists in varying the orientation of the inlet of said die with respect to said fusion thereby varying the configuration of said stock.

4. The method of controlling the configuration of elongated silica stock during the drawing of said stock through a die the inlet of which is submerged in a silica fusion which consists in raising or lowering said die to decrease or increase the resistance of said die to withdrawal of silica therethrough.

5. In apparatus for producing shaped ware from a fusible refractory material, the combination of a furnace housing for holding a charge of said material, a die movably mounted to penetrate said charge, a core adjustably positioned with respect to said die, and means for maintaining a predetermined relation between said core and said die during motion of the latter through said charge.

6. The method of producing shaped ware from a fused silica mass which comprises drawing plastic silica through spaced die and core members and progressively advancing both of said members through the fused mass.

PHILIP K. DEVERS.